June 26, 1956  J. A. CALDWELL ET AL  2,752,579
PIPE UNION WITH INSULATED CONTACT PLATE
Filed March 30, 1953
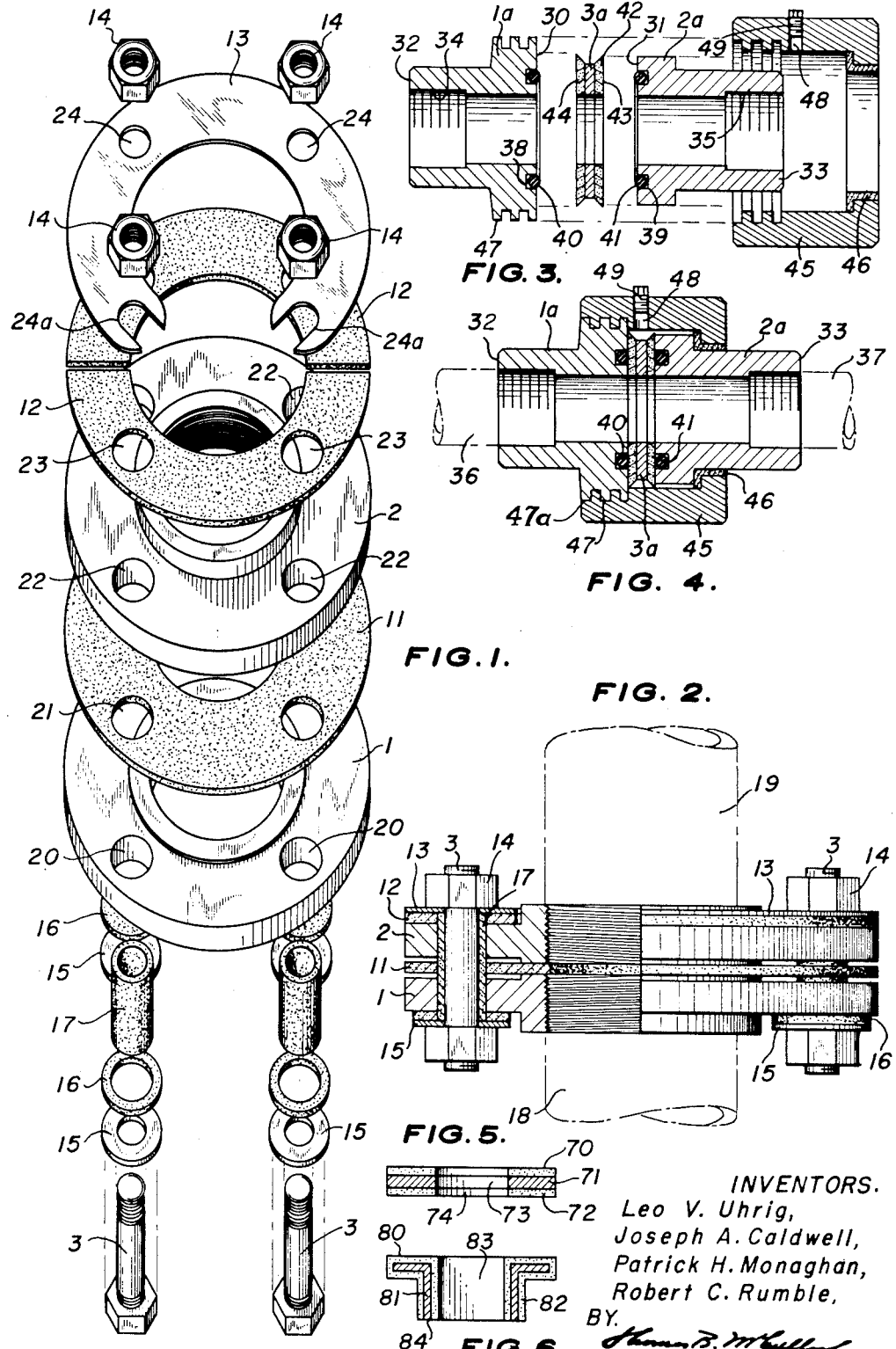
INVENTORS.
Leo V. Uhrig,
Joseph A. Caldwell,
Patrick H. Monaghan,
Robert C. Rumble,
BY
ATTORNEY.

United States Patent Office 2,752,579
Patented June 26, 1956

2,752,579
PIPE UNION WITH INSULATED CONTACT PLATE

Joseph A. Caldwell, Houston, Patrick H. Monaghan, Bellaire, and Robert C. Rumble and Leo V. Uhrig, Houston, Tex., assignors, by mesne assignments, to Esso Research and Engineering Company, Elizabeth, N. J., a corporation of Delaware Application March 30, 1953, Serial No. 345,578

4 Claims. (Cl. 339—15)

The present invention is directed to a pipe connecting means. More particularly, the invention is directed to a pipe connecting means which is insulated electrically. In its more specific aspects, the invention is directed to an insulated pipe connecting means which allows detection of electrical leaks.

The present invention may be described as a metallic pipe connecting means comprised of at least three metallic elements provided with electrical insulating means insulating electrically each of said elements one from another.

The pipe connecting means may be either a pipe union or a pipe flange. It is contemplated that the pipe connecting means whether a pipe union or a flange will be suitably provided with electrical insulating means which will allow detection of leaks between each of the elements of the connecting means.

The invention also includes an electrical insulating means comprising a metallic member embedded in a body of electrical insulating material with the metallic member having at least one electrically exposed surface. The metallic member may be either a metallic plate, such as an annular metallic plate, or it may be an annular member which defines in cross section a right angle.

The invention will be further described by reference to the drawing in which

Fig. 1 is an exploded view of a pipe flange in accordance with the present invention;

Fig. 2 is an assembled view in partial section of the pipe flange in accordance with Fig. 1;

Fig. 3 is an exploded view of a pipe union in accordance with the present invention;

Fig. 4 is an assembled sectional view of the apparatus of Fig 3;

Fig. 5 is a cross-sectional view of an electrical insulating means including an annular plate; and Fig. 6 is a modification of Fig. 5 showing the annular member in cross section defining a right angle.

Referring now to the drawing and particularly to Figs. 1 and 2, numeral 1 designates a first metallic companion flange, and numeral 2 designates a second metallic companion flange. The companion flanges 1 and 2 are designed to be held in coupling relationship by metallic bolts 3. The companion flanges 1 and 2 have arranged between them an annular insulating member 11. The flange of our invention is also provided with a second insulating member 12 which also is of annular shape and may be constructed of two parts, if desired, as shown. An annular metallic plate 13 of a horse-shoe shape forms part of the flange and serves to connect electrically the hexagonal nuts 14 which hold the assembly together when threadably engaged with the threaded bolts 3. The threaded bolts 3 are provided with metallic washers 15, electrical insulating washers 16 and electrical insulating sleeves 17. The flanges 1 and 2 are adapted to be threadably engaged with pipes 18 and 19.

The flanges 1 and 2 and the insulating means 11 and 12 are provided with ports 20, 21, 22 and 23, respectively, to allow passage of the bolts 3 therethrough and to allow assembly of the flange. The metal plate 13 is also provided with ports 24 and open slots 24a to allow passage therethrough of the threaded ends of the bolts 3 for engagement with the hexagonal nuts 14.

Turning now to the apparatus of Figs. 3 and 4, the pipe union is comprised of coupling metallic members 1a and 2a each of which has a seating face 30 and 31 on a seating end thereof. A free end 32 and 33 of the members 1a and 2a are provided, respectively, with threaded connections 34 and 35 for connection to pipes 36 and 37, respectively.

The faces 30 and 31 of the members 1a and 2a define recesses 38 and 39, respectively, in which are arranged, respectively, deformable sealing members 40 and 41 which suitably may be O-rings. Arranged between the faces 30 and 31 is an electrical insulating means 42 comprised of a metallic plate 3a and annular insulating material 43 and 44. The plate 3a and the insulating material 43 and 44 may be separate elements, but preferably the plate 3a is embedded as a sandwich between the elements 43 and 44, the plate 3a being electrically exposed for the purposes as will be described further. The pipe union is connected together by coupling member 45, provided with an electrical insulating means 46 in the shape of an annular member defining in cross section a right angle. The coupling means 45 defines rough internal threads 47a for mating with the rough external threads 47 of the member 1a. The coupling 45 is also provided with a passageway 48 which suitably may be closed by an Allen head set screw 49 or by a cover flap and the like to prevent entry of grease, dirt or debris into passageway 48 and in contact with the plate 3a.

Referring now to Fig. 5, an electrical insulating means 70 is comprised of a metallic plate 71 carrying electrical insulating material 72 on the opposed plate surfaces thereof. The plate 71 may be an annular plate provided with a passageway 73 and the insulating members 70 may also be provided with a similar passageway 74 to allow the electrical insulating means to be used, such as in the devices of Figs. 1 and 2 and Figs. 3 and 4. For example, the electrical insulating means 70 may be used in lieu of insulating means 11 in Figs. 1 and 2 or in lieu of element 42 in Figs. 3 and 4.

Referring now to Fig. 6, an electrical insulating means 80 has an annular metallic member 81 which may define a right angle in cross section embedded in the electrical insulating means 82. The assembly 80 is provided with a central passageway 83 to allow the article to be used in the apparatus of Figs. 3 and 4 as shown with respect to the numeral 46. It will be noted in connection with the embodiment of Fig. 6 that the annular member 81 has an exposed face 84 but is otherwise embedded in the insulating material 82.

The apparatus of the present invention is particularly suited to be used in oil well flow lines to prevent corrosion of the surface pipe and associated ferrous metal equipment by circulation of natural electrical currents in the well system. It is customary to insulate flanges in ferrous metal well systems, but these flanges do not always serve the purpose for which they are designed in that, while the flanges may be insulated, frequently the electrical insulation breaks down and flow of current occurs which normally cannot be readily detected. In accordance with our invention, such breakdowns of insulation may be detected and an improved flange is provided.

The apparatus of Figs. 1 and 2 may be assembled into pipes 18 and 19 as shown with respect to Fig. 2, and when it is desired to test for electrical insulation, it would be possible by employing a suitable millivoltmeter to determine the flow of current between flanges 1 and 2 or between flange 1 and bolts 3 or between flange 2 and bolts 3.

In the present invention, the washers 16 and the sleeve 17 and the insulating means 11 and 12 serve to provide positive electrical insulation at all times, the plate 13 tying the hexagonal nuts 14 electrically together.

The plate 13 used to bond the bolts together for good electrical contact may suitably be constructed of 16-gauge thickness ferrous metal.

The apparatus of the present invention is preferably constructed of ferrous metal but suitably may be constructed of any electrical conducting metal. The electrical insulating means is preferably of a fibrous electrical insulating material, such as linen impregnated with Bakelite. Teflon, which is a tetrafluorinated polyethylene, is a suitable electrical insulating means and also may be employed for construction of the deformable sealing member. The electrical insulating means and deformable member should not be attacked by hydrocarbons and suitably may be any thermosetting oil insoluble resin which does not conduct electricity.

The devices of Figs. 5 and 6 may suitably be used in the apparatus of Figs. 3 and 4. It is noted that in Figs. 3 and 4, the plate 3a and the insulation means 43 and 44 are described as separate members, however, as described with respect to Fig. 5, the element designated as 42 in Fig. 3 may be composed of a single article as described in Fig. 5. Likewise the element designated by numeral 46 in Figs 3 and 4 may have a metallic member 81 imbedded therein which will allow testing for electrical leaks between the coupling 45 and the element 2a.

The apparatus of Figs. 1 and 2 may suitably be employed as described in oil well flow lines in order to permit testing such flanges to determine whether or not current is flowing across the insulation. A suitable millivoltmeter provided with electrical contacts may be employed to detect the flow across the metal members 1, 2, and 3 by contacting the metallic members with the electrical contacting means of the millivoltmeter to determine the flow of current, if any.

With respect to the devices of Figs. 3 and 4, the electrical contacts of the millivoltmeter would be contacted with the members 1a or 2a and with the member 3a by employing a suitable electrical probe which would be inserted in the passageway 48 after removing the Allenhead set screw 49 or a cover flap, whichever may be used. It is desirable that the probe be insulated electrically except for the extreme tip thereof so that it may contact only the plate 3a.

Likewise, in the devices of Figs. 5 and 6, which are illustrations of modifications of the elements 11 and 46, respectively, the contact means of the millivoltmeter would be employed to contact the member 71 or the member 84.

It will be seen from the foregoing brief description of the use of our invention that the flanges or unions may suitably be assembled to provide the necessary insulation in a flow line against natural currents and the efficacy of the devices determined readily by the use of a millivoltmeter as has been described.

While the apparatus of the present invention has the most utility in insulating pipe connections, it may be adapted to a wide variety of uses such as insulation of tanks from piping systems and insulation of tanks from tanks, particularly with respect to the devices of Figs. 5 and 6.

The nature and objects of the present invention having been completely described and illustrated, what we wish to claim as new and useful and to secure by Letters Patent is:

1. A pipe union comprised of a first metallic member adapted to be connected rigidly to a pipe having a seating face on an end opposite a pipe connecting end, a second metallic member adapted to be connected rigidly to a pipe having a seating face on an end opposite a pipe connecting end, a metallic annular plate arranged between said faces, first and second annular electrical insulating means arranged between outer surfaces of said plate and each of said faces, said plate presenting at least one electrically exposed surface, a coupling member surrounding a first of said members and engageable with a second of said members to hold said members in coupling relationsip, said coupling member being provided with electrical insulating means insulating electrically said coupling member from said first member and said coupling member also being provided with a passageway communicating an exterior of said coupling member with said exposed surface of said plate.

2. A pipe union comprised of a first metallic member adapted to be rigidly connected to a pipe having a seating face on an end opposite a pipe connecting end, a second metallic member adapted to be rigidly connected to a pipe having a seating face on an end opposite a pipe connecting end, each of said seating faces defining an annular recess, a deformable sealing means in each of said recesses, a metallic annular plate arranged between said faces, first and second annular electrical insulating means arranged between outer surfaces of said plate and each of said faces, said plate presenting at least one electrically exposed surface, a coupling member surrounding a first of said members and engageable with a second of said members to hold said members in coupling relationship, said coupling member being provided with electrical insulating means insulating electrically said coupling member from said first member and said coupling member also being provided with a passageway communicating said coupling member with said exposed surface of said plate.

3. A pipe union in accordance with claim 2 in which the deformable sealing member is an O-ring.

4. A pipe union comprised of a first metallic member adapted to be rigidly connected to a pipe having a first seating face on an end opposite a pipe connecting end, a second metallic member adapted to be rigidly connected to a pipe having a second seating face on an end opposite a pipe connecting end, each of said faces defining an annular recess, a deformable O-ring in each of said recesses, a metallic annular plate arranged between said faces, first and second annular electrical insulating means arranged between the outer surface of said plate and each of said faces, said first and second annular electrical insulating means extending ahead of said plate a sufficient distance to protect said plate from electrical contact with said seating surfaces and said plate presenting at least one exposed electrical surface, a coupling member surrounding a first of said members and engageable with a second of said members to hold said members in coupling relationship, said coupling member being provided with electrical insulating means insulating electrically said coupling member from said first member and said coupling member also being provided with a passageway communicating the exterior of said coupling member with said exposed surface of said plate.

References Cited in the file of this patent

UNITED STATES PATENTS

| | | |
|---|---|---|
| 323,731 | Phillips | Aug. 4, 1885 |
| 397,218 | Bergmann | Feb. 5, 1889 |
| 1,491,032 | Croker | Apr. 22, 1924 |
| 1,656,912 | Foster | Jan. 24, 1928 |
| 2,234,441 | Ludwig | Mar. 11, 1941 |
| 2,407,076 | Harkness | Sept. 3, 1946 |
| 2,627,580 | Picard | Feb. 3, 1953 |

FOREIGN PATENTS

| | | |
|---|---|---|
| 89,677 | Switzerland | Sept. 15, 1920 |
| 101,531 | Australia | July 5, 1937 |